US009193151B2

(12) United States Patent
Okada et al.

(10) Patent No.: US 9,193,151 B2
(45) Date of Patent: Nov. 24, 2015

(54) INK JET RECORDING METHOD

(71) Applicant: Seiko Epson Corporation, Tokyo (JP)

(72) Inventors: Hideki Okada, Shiojiri (JP); Masaru Kumagai, Shiojiri (JP); Takamasa Ikagawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 13/873,754

(22) Filed: Apr. 30, 2013

(65) Prior Publication Data

US 2013/0241991 A1 Sep. 19, 2013

Related U.S. Application Data

(63) Continuation of application No. 13/078,522, filed on Apr. 1, 2011, now Pat. No. 8,449,098.

(30) Foreign Application Priority Data

Apr. 1, 2010 (JP) ................................ 2010-085469

(51) Int. Cl.

*G01D 11/00* (2006.01)
*B41J 2/01* (2006.01)
*B41J 2/155* (2006.01)
*B41J 2/21* (2006.01)

(52) U.S. Cl.

CPC .. *B41J 2/01* (2013.01); *B41J 2/155* (2013.01); *B41J 2/2146* (2013.01); *B41J 2202/20* (2013.01)

(58) Field of Classification Search

CPC .......... B41J 11/002; B41J 2/01; B41J 2/2107
USPC .......................................... 347/100, 102, 95
See application file for complete search history.

(56) References Cited

U.S. PATENT DOCUMENTS

| | | | | |
|---|---|---|---|---|
| 7,484,821 | B2 | 2/2009 | Sudo et al. | |
| 7,708,821 | B2 | 5/2010 | Kiyomoto et al. | |
| 8,110,034 | B2 | 2/2012 | Saito et al. | |
| 8,454,110 | B2 | 6/2013 | Ochiai et al. | |
| 2006/0211790 | A1* | 9/2006 | Dimotakis et al. | 523/160 |
| 2007/0263054 | A1 | 11/2007 | Yatake et al. | |
| 2008/0182083 | A1 | 7/2008 | Oyanagi et al. | |
| 2010/0033522 | A1* | 2/2010 | Saito et al. | 347/9 |
| 2010/0189902 | A1* | 7/2010 | Koike et al. | 347/100 |
| 2010/0247874 | A1* | 9/2010 | Ishihara et al. | 347/100 |
| 2011/0242213 | A1 | 10/2011 | Okada et al. | |

FOREIGN PATENT DOCUMENTS

| | | | |
|---|---|---|---|
| JP | 2006-116794 | A | 5/2006 |
| JP | 2007-185904 | A | 7/2007 |
| JP | 2007-283544 | A | 11/2007 |
| JP | 2009-012390 | A | 1/2009 |
| JP | 2009-155662 | A | 7/2009 |
| JP | 2009-256605 | A | 11/2009 |

* cited by examiner

*Primary Examiner* — Jannelle M Lebron
(74) *Attorney, Agent, or Firm* — Nutter McClennen & Fish LLP

(57) ABSTRACT

An ink jet recording method using a recording apparatus including a plurality of ink jet heads, comprising performing printing by depositing droplets of an ink composition ejected from the ink jet heads on a recording medium, wherein the ink jet heads are aligned in a direction cross to a transporting direction of the recording medium and the ink composition has a yield value of 0.50 to 2.00 mPa.

3 Claims, 4 Drawing Sheets

INK JET RECORDING METHOD

Priority is claimed under 35 U.S.C. §120 to U.S. patent application Ser. No. 13/078,522, filed Apr. 1, 2011, and under 35 U.S.C. §119 to Japanese Priority Application No. JP 2010-085469 filed on Apr. 1, 2010, which are hereby incorporated by reference in their entireties.

BACKGROUND

1. Technical Field

The present invention relates to an ink jet recording method.

2. Related Art

The ink jet recording method is a technique for printing performed by ejecting droplets of an ink onto a recording medium, such as a paper sheet, from an ink jet head. The ink jet recording method is being innovatively developed and increasingly applied to high-resolution image recording (printing), which has been performed by photo printing and offset printing. For the ink jet recording method, it is desirable that ink ejection nozzles of ink jet heads be prevented from being clogged.

One of the ink jet recording methods has been known in which a line head including ink ejection nozzles linearly aligned ejects droplets of an ink composition (hereinafter may be referred to as ink droplets) onto a recording paper being transported at a speed according to the ejection speed and volume of ink droplets. In order to increase the resolution of the image printed by this recording method, an arrangement of ink jet heads each including nozzles aligned in a straight line is proposed. In this arrangement, the ink jet heads are disposed in the direction along the width of the recording medium in a staggered manner across the entire width of the recording medium with no spaces so that the pitch of the nozzles is reduced to reduce the dot pitch.

In this instance, solid printing can be performed by overlapping ink jet heads adjacent to each other in the direction in which the recording medium is transported (hereinafter referred to as the transport direction). However, if the volume of the ink droplet ejected from the ink ejection nozzles in the overlap portion of each ink jet head overlapping with the adjacent ink jet head is set to be equal to the volume of the ink droplet ejected from the nozzles in the non-overlap portion or middle portion of the ink jet head, the overlap portions of the two ink jet heads eject ink droplets to the same position on the recording medium. Consequently, a striped pattern of nonuniform density is formed in the image. Such nonuniformity in density can be prevented by setting the ejection volume so that the ink ejection nozzles in the middle portion eject a larger volume of ink droplet than the ink ejection nozzles in the overlap portion. For example, JP-A-2007-185904 discloses an ink jet image printing system that perform printing on an image printing medium using a line head having overlap portions in which a predetermined number of nozzles of each head chip are aligned with nozzles of the adjacent head chip. The ink jet image printing system includes a density detector that detects the density of the image formed, an image memory module in which image data is stored, and a controller that controls the amount of ink to be ejected from the overlap portion of the head chips according to the difference in image density between an image formed by the overlap portion and an image formed by the middle portion of the head chip, obtained from the image data read out of the image memory module.

The above cited patent document describes that if the ink ejection nozzles of the overlap portion are slightly displaced along the line of the nozzle alignment by the displacement of an ink jet head to increase or reduce the nozzle-to-nozzle distance between the heads relative to the nozzle-to-nozzle distance in a head, the image printed on the recording medium exhibits nonuniformity in density or undesired white stripes at the portion corresponding to the joint of the heads. According to this document, the above system can solve such an issue.

However, the present inventors have conducted detailed research on the system disclosed in the above-cited document and found that even this system cannot sufficiently solve the issue of the striped pattern of nonuniform density in printed images.

SUMMARY

An advantage of some aspects of the invention is that it provides an ink jet recording method that can suppress the clogging of ink ejection nozzles and prevent a striped pattern of nonuniform density in the printed image.

The present inventors found that the use of an ink composition whose specific property has been controlled within a predetermined range for an ink jet recording method can prevent the clogging of ink ejection nozzles and the striped pattern of nonuniform density in printed images. The invention is based on this finding.

According to an aspect of the invention, an ink jet recording method is provided which uses a recording apparatus including a plurality of ink jet heads, each having a plurality of ink ejection nozzles linearly aligned in a nozzle alignment direction. The ink jet heads are aligned in the nozzle alignment direction and staggered in a direction perpendicular to the nozzle alignment direction. In the ink jet recording method, printing is performed by depositing droplets of an ink composition ejected from the ink ejection nozzles on a recording medium transported in the direction perpendicular to the nozzle alignment direction in such a manner that the droplets ejected from at least one ink ejection nozzle located at an end of each of the ink jet heads adjacent to each other in the direction perpendicular to the nozzle alignment direction are deposited one on the other. The volume of droplet ejected from the ink ejection nozzle located at the end of the ink jet head is smaller than the volume of ink droplet ejected from each of the other ink ejection nozzles of the ink jet head, and the ink composition has a yield value of 0.50 to 2.00 mPa.

The ink jet recording method of the present embodiment can suppress the clogging of the ink ejection nozzles and can also sufficiently prevent a striped pattern of nonuniform density from being formed in the printed image. The reason of this is not clear. The present inventors however consider that nozzle clogging is suppressed (ejection is stabilized) by controlling the yield value of the ink composition to 2.00 mPa or less, and this may be one of the reasons. The inventors also consider that ink-droplets deposited on the recording medium can be suppressed from spreading outward to cause bleeding by controlling the yield value of the ink composition to 0.50 mPa or more, and that thus the occurrence of a striped pattern of nonuniform density can be prevented. In particular, if ink droplets are deposited on positions displaced in the nozzle alignment direction, a striped pattern of nonuniform density is liable to be formed when adjacent droplets are joined to each other by their bleeding. This phenomenon is particularly pronounced on woodfree paper and plain paper (absorbable medium), which are recording media liable to cause bleeding. The ink jet recording method of an embodiment of the invention can prevent the occurrence of a striped pattern of nonuniform density even in such a case.

Preferably, the ratio of the shear viscosities at shear rates of 10 $S^1$ and 1000 $s^1$ (hereinafter referred to as thixotropic index, TI) of the ink composition is 1.10 to 1.20. In this instance, nonuniformity in density can be prevented effectively and reliably. The ink composition may contain a self-dispersing carbon black as a pigment, a water-soluble organic solvent, a surface tension modifier, and 10% to 60% by mass of water.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
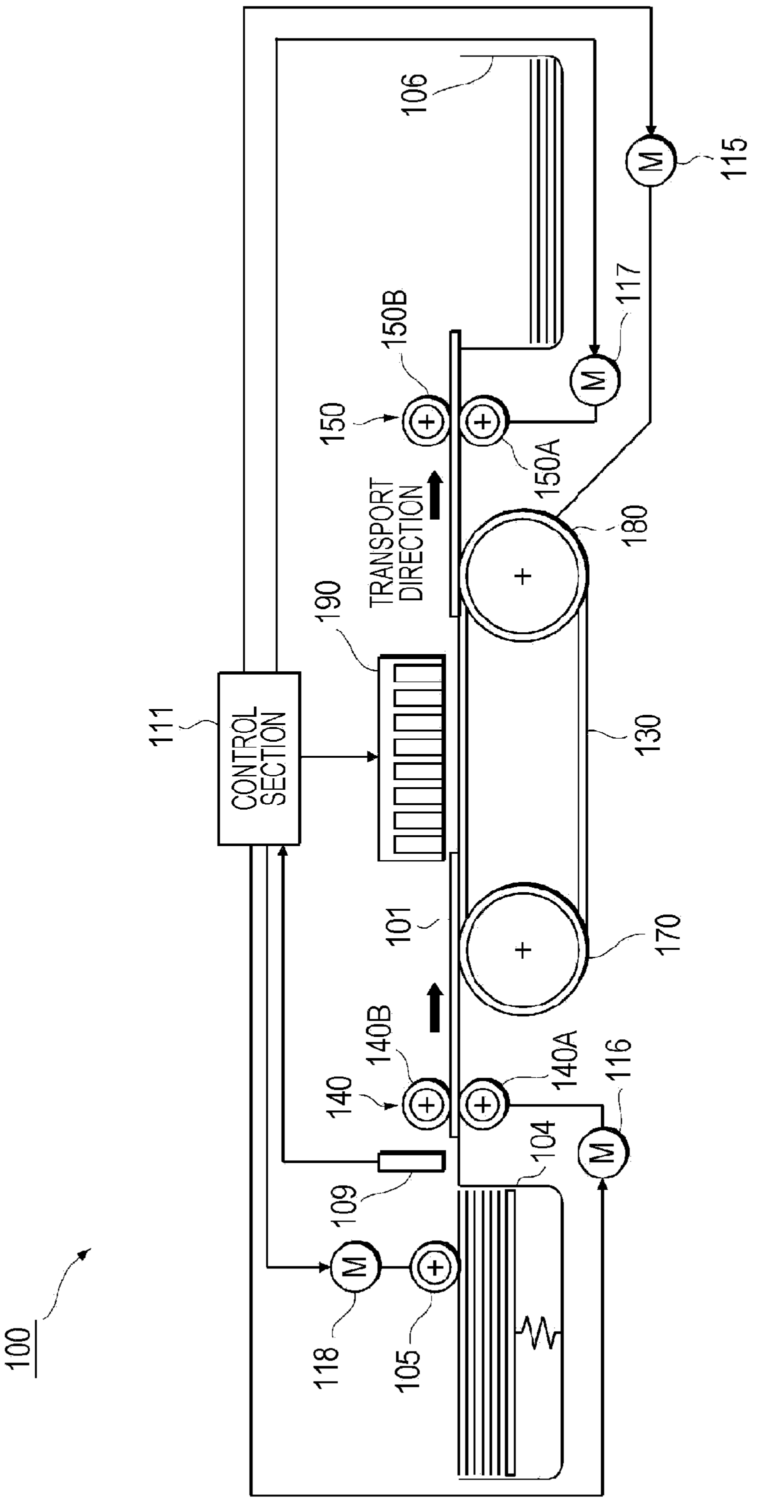
FIG. 1 is a schematic view of an ink jet recording apparatus used in an embodiment of the invention.

An embodiment of the invention will now be described in detail with reference to the drawings. However, the invention is not limited to the embodiment. Also, various modifications may be made without departing from the scope and spirit of the invention. In the drawings, the same elements are designated by the same reference numerals and the same description will not be repeated. The relative positions and other positional relationship accord with the drawings unless otherwise specified. The dimensional proportions in the drawings are not limited to those shown in the drawings.

The ink jet recording method of the present embodiment uses a recording apparatus including a plurality of ink jet heads, each having a plurality of ink ejection nozzles linearly aligned in a nozzle alignment direction. The ink jet heads are aligned in the nozzle alignment direction and staggered in a direction perpendicular to the nozzle alignment direction. In the ink jet recording method, printing is performed by depositing droplets of an ink composition ejected from the ink ejection nozzles on a recording medium transported in the direction perpendicular to the nozzle alignment direction. The droplets ejected from at least one ink ejection nozzle located at an end of each of the ink jet heads adjacent to each other in the direction perpendicular to the nozzle alignment direction are deposited one on the other. The volume of droplet ejected from the ink ejection nozzle located at the end of the ink jet head is smaller than the volume of ink droplet ejected from each of the other ink ejection nozzles of the ink jet head, and the ink composition has a yield value of 0.50 to 2.00 mPa.

The yield value, shear viscosity, thixotropic index (TI), and residual viscosity mentioned herein are determined as below. First, while the shear rate of an ink composition at 20° C. is varied in the range of 10 to 1000 $S^1$, the shear stress and the shear viscosity are measured to obtain the relationship between the shear rate and the shear stress, and the ratio of the shear viscosities at shear rates. The ratio of the shear viscosities at different shear rates corresponds to TI. The shear viscosity mentioned herein refers to the shear viscosity at a shear rate of 200 $s^{-1}$. Subsequently, the yield value and residual viscosity are calculated by applying the measured values obtained above to Casson Equation: $\sqrt{S}=a\times\sqrt{D}+b$ In the Casson Equation, S represents the shear stress (unit: Pa), D represents the shear rate (unit: 1/s), and a and b each represent a constant. Non-Newtonian fluid liquids, many of which apply to the Casson equation, are used in considerably broad fields. The square of slope a represents the residual viscosity, and the square of intercept b represents the yield value. These are property values of a liquid. As is clear from the Casson equation, the residual viscosity refers to the viscosity at infinite shear rate, and the yield value refers to the stress at a shear rate of zero.

Figure 2:
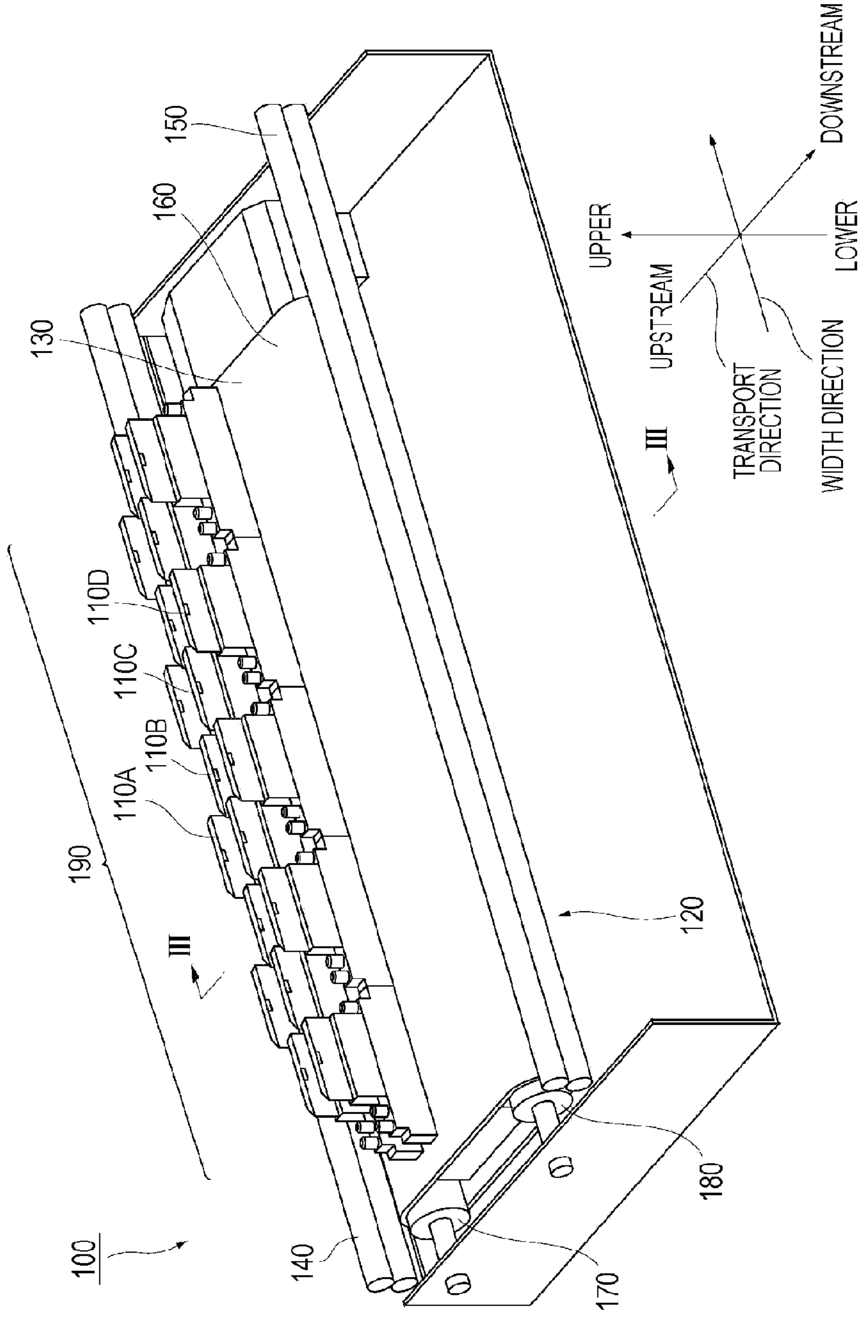
FIG. 2 is a schematic perspective view of a part of an ink jet recording apparatus used in an embodiment of the invention.
Figure 3:
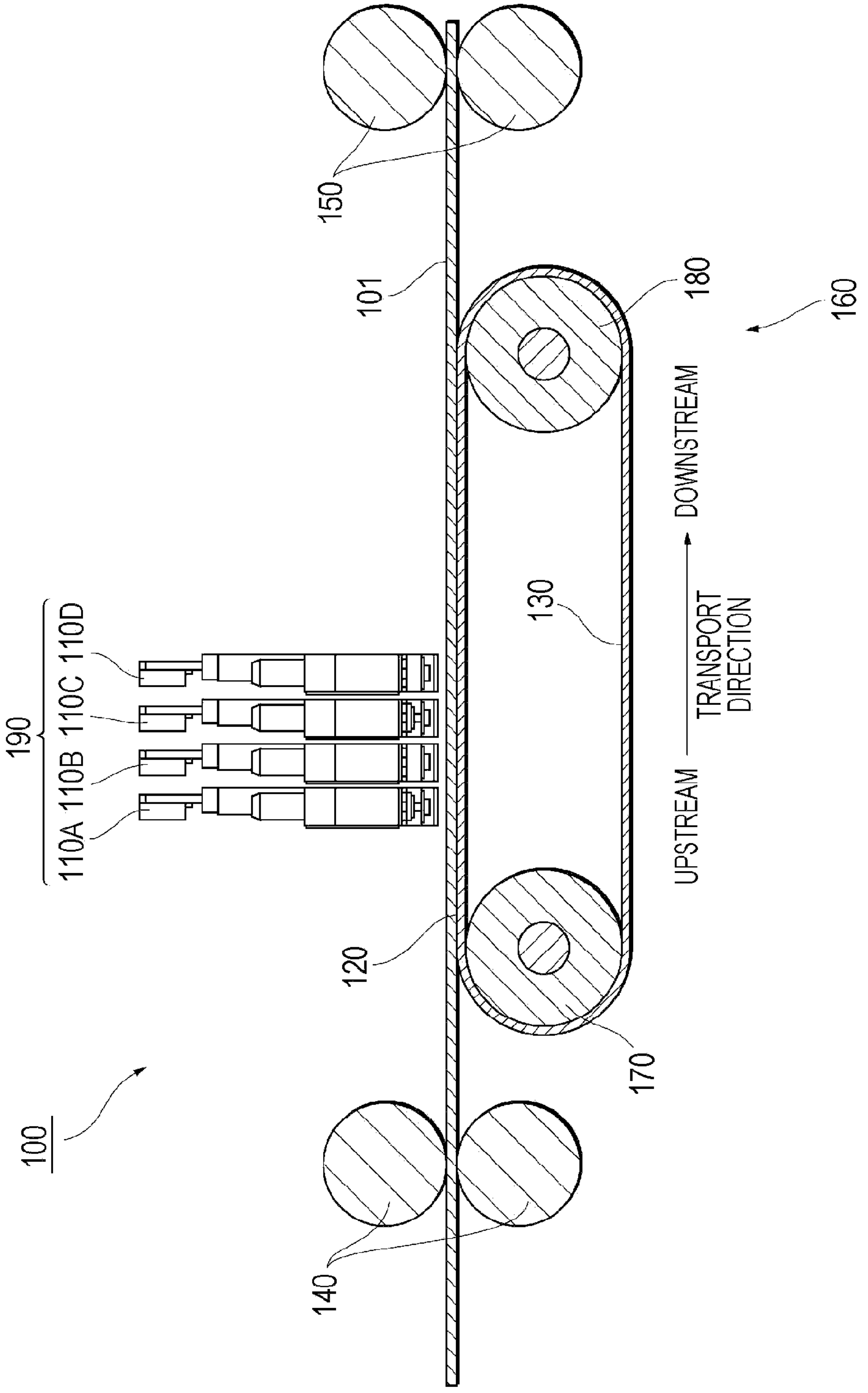
FIG. 3 is a schematic sectional view taken along line shown in FIG. 2.

An ink jet recording apparatus used in the ink jet recording method of the present embodiment may have the structure shown in FIGS. 1, 2 and 3. FIG. 1 is a schematic view of the ink jet recording apparatus, particularly showing the paper transport portion, and FIG. 2 is a schematic perspective view of a part of the recording apparatus. FIG. 3 is a schematic sectional view of the ink jet recording apparatus taken along line III-III in FIG. 2, showing a state in which a recording medium, such as plain paper, is transported.

The plain paper mentioned herein refers to a non-coated paper mainly made from pulp and used in printers or the like. More specifically, plain papers include woodfree paper defined as No. 6074 in JIS P 0001, PPC paper defined as No. 6139 in JIS P 0001, and other non-coated printing papers. Commercially available papers such as Xerox 4200 (manufactured by Xerox) and GeoCycle (manufactured by Gerogia-Pacific) may be used as plain paper.

The ink jet recording apparatus will be described with reference to FIG. 1, first. A line-type ink jet recording apparatus 100 capable of high-speed printing typically includes an ink jet head unit 190 that ejects droplets of ink compositions onto a recording medium 101, such as plain paper, to record images, a transport belt 130 that transports the recording medium 101 to a position under the ink jet head unit 190, an accommodating cassette 104 in which the recording medium 101 is accommodated, a paper feed roller 105 that feeds the recording medium 101 from the accommodating cassette 104, a pair of transport rollers (gate rollers) 140 for transport the recording medium 101, a pair of ejection rollers 150 for ejecting the recording medium 101, a paper ejection cassette 106 that receives the printed recording medium 101, a control section 111, and a position-detecting sensor 109 that detects the position of the recording medium 101.

The ink jet head unit 190 includes a plurality of ink jet heads 110A, 110B, 110C and 110D (or 110A to 110D, these reference numerals are not shown in FIG. 1) corresponding to the respective types of ink. The ink jet heads each have linearly aligned ink ejection nozzles and are configured into a line head structure in which the ink ejection nozzles are aligned in the width direction of the recording medium 101 across the entire width of the recording medium.

The transport belt 130, which is a ring, transports the recording medium 101 to the position of the ink jet head unit 190 (printing region). A driving roller 180 drives the transport belt 130 and a driven roller 170 is driven so as to oppose the transport belt 130 to ink-ejection ports of the ink jet head unit 190. The driving roller 180 is operated by a motor 115 controlled by the control section 111. The paper feed roller 105 is intended to send the recording medium 101 in the accommodating cassette 104 to the transport rollers 140, and are operated by a motor 118 controlled by the control section 111.

The transport rollers 140 include a driving roller 140A acting as a roller unit operated by a motor 116 controlled by the control section 111, and a driven roller 140B driven by contact with the driving roller 140A. The ejection rollers 150 constitute an ejection roller pair including a driving roller 150A operated by a motor 117 controlled by the control section 111, and a driven roller 150B driven by contact with the driving roller 150A.

The control section 111 includes a CPU (central processing unit) that performs printing operation (recording operation) and other operations, a RAM (random access memory) module that stores printing data (recording data) transmitted from a host computer through an interface (IF) in a data storage region or temporarily stores other data, and a PROM or EEPROM (electrically erasable programmable read-only memory) module that stores a control program or the like for controlling various portions.

A position-detecting sensor 109 is a reflective photosensor prepared by, for example, combining an IR emitting diode acting as a light-emitting device, and a phototransistor acting as a light-receiving element. The position-detecting sensor 109 is disposed at a paper transport portion between the paper feed roller 105 and the transport rollers 140, and detects the front end position of the transported recording medium 101 (the presence or absence of the recording medium 101). The detection signal of the sensor is transmitted to the control section 111. The control section 111 controls the transport rollers 140 according to the detection signal of the front end of the recording medium 101.

The recording medium 101 is transported to the transport rollers 140 rotated by the motor 116 operated according to a driving signal from the control section 111 to come into contact with the transport rollers 140. Consequently, the position and orientation of the front end of the recording medium 101 are aligned by the contact of the front end with the transport rollers, so that the recording medium 101 is pinched between the driving roller 140A and the driven roller 140B and sent onto the transport belt 130. When the recording medium 101 is transported to the printing region under the ink jet head unit 190 by the transport belt 130, ink droplets are ejected onto the recording medium 101 being transported on the transport belt 130 from the ink ejection nozzles of the ink jet head unit 190. Thus printing is performed according to printing data.

For printing on the recording medium 101, in the control section 111, the RAM module receives printing data from a host computer through the interface, and the CPU processes the data in a predetermined manner. According to the processed data, a driving signal is outputted to the head driver and then inputted to the ink jet head unit 190. Consequently, an electrostatic actuator to which the driving signal has been inputted operates so that ink droplets are ejected onto the recording medium 101 through the corresponding nozzles to print (record) an image according to the printing data. In this operation, the control section 111 may detect the density of the image and control the volume of ink to be ejected from the nozzles according to the change in image density, as disclosed in the above-cited patent document. Consequently, even if the nozzles are slightly displaced in their alignment direction, nonuniformity in density or undesired white stripes, which may be caused at the portion corresponding to the joint of the heads by the displacement, can be suppressed to some extent.

The printed recording medium 101 is transported to the ejection portion (ejection rollers 150) by the transport belt 130. When the transported recording medium 101 has been reached the ejection rollers 150, the motor 117 rotates the driving roller 150A according to a driving signal from the control section 111, and the recording medium 101 is pinched between the driving roller 150A and the driven roller 150B rotated by the contact with the driving roller 150A and thus transported into the paper ejection cassette 106.

Turning now to FIGS. 2 and 3, the present embodiment will be further described. The ink jet recording apparatus 100 includes the ink jet head unit 190, a platen portion 120 disposed under the ink jet head unit 190 so as to oppose each other, a recording medium feed portion (not shown) that feeds the recording medium 101 at the upstream side of the platen portion 120 in the transport direction, a recording medium receiving portion (not shown) that receives the printed recording medium 101 at the downstream side of the platen portion 120 in the transport direction, and a transport unit 160 that transports the recording medium 101 over the platen portion 120 from the recording medium feed portion and further transports the recording medium 101 to the recording medium receiving portion after being printed.

The ink jet head unit 190 includes a plurality of ink jet heads 110A to 110D, each having linearly aligned ink ejection nozzles. The ink jet heads 110A to 110D are aligned in the direction perpendicular to the transport direction of the recording medium (width direction of the recording medium, or nozzle alignment direction) in a staggered manner, thereby enabling line printing.

The ink jet heads 110A and 110B eject droplets of the same first ink composition, and the other ink ejection heads 110C and 110D eject droplets of the same second ink composition. The color of the first ink composition ejected from the ink jet heads 110A and 110B is different from the color of the second ink composition ejected from the ink jet heads 110C and 110D. The ink jet heads 110A and 110B are overlapped with each other when viewed from the recording medium-transport direction so that the first ink composition can form an image at any position across the width of the recording medium. The ink jet heads 110C and 110D are also arranged in the same manner.

Figure 4:
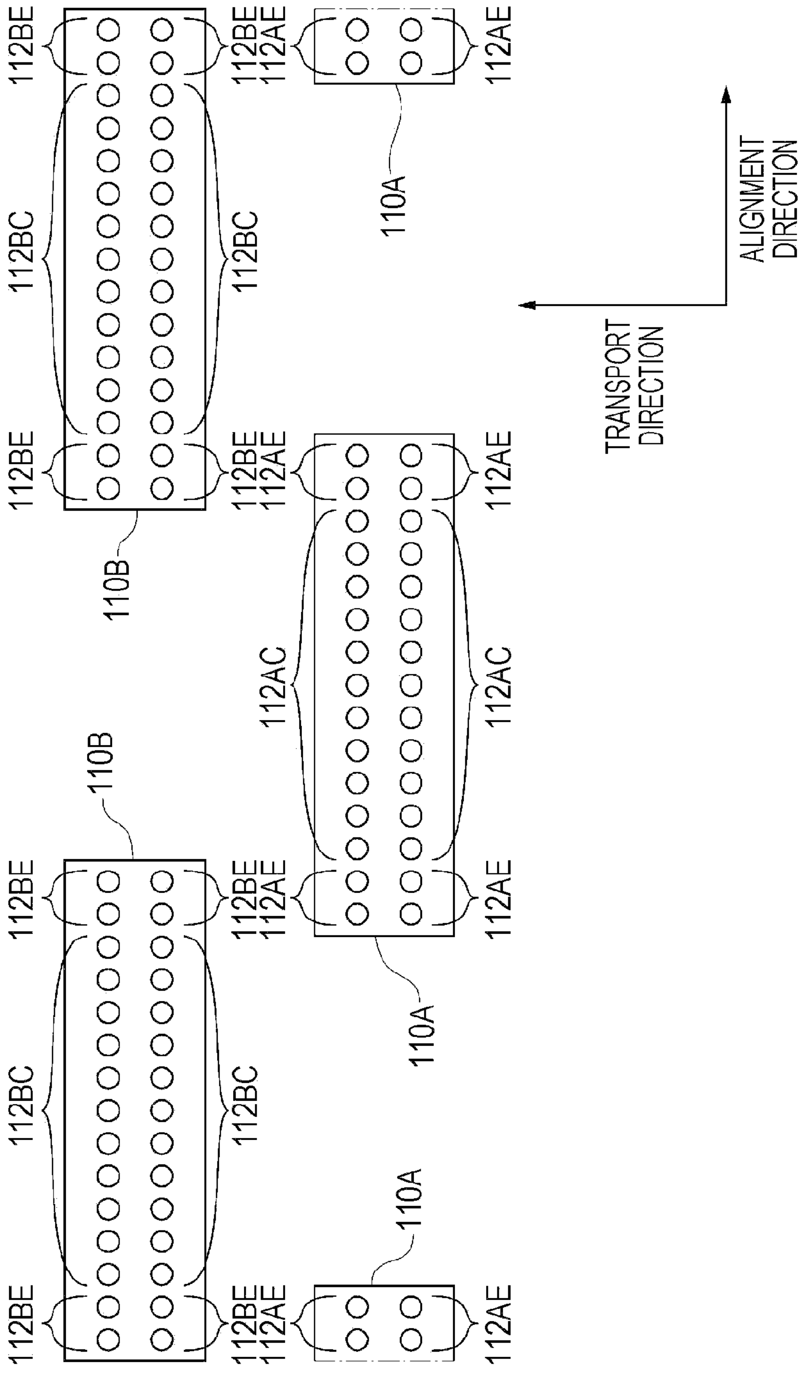
FIG. 4 is a schematic view illustrating the relationship between the arrangements of ink jet heads and ink ejection nozzles shown in FIG. 2.

FIG. 4 is a fragmentary schematic view illustrating the relationship between the arrangements of the ink jet heads 110A and 110B and the ink ejection nozzles. The ink jet head 110A has two lines of ink ejection nozzles 112AC and 112AE, and the ink jet head 110B has two lines of ink ejection nozzles 112BC and 112BE. While the ink ejection nozzles 112AE and 112BE are aligned with each other in the transport direction, the ink ejection nozzles 112AC and 112BC are disposed so as not to align with each other in the transport direction. In FIG. 4, the number of ink ejection nozzles aligned in the transport direction is two at an end of each line of the ink ejection nozzles of the ink jet head. This number is not limited to two as long as it is at least one and the presence of ink ejection nozzles not aligned in the transport direction is ensured.

The platen portion 120 includes a transport belt 130 on which the recording medium 101 is transported. The transport belt 130 doubles as a platen belt. The transport unit 160 includes the transport belt 130 and the pairs of transport rollers 140 and ejection rollers 150 respectively disposed at the upstream side and the downstream side of the transport belt 130 in the transport direction. The rollers of each pair oppose each other so as to pinch the recording medium 101 from the vertical direction. The transport belt 130 is operated so as to transport the recording medium 101 thereon in the transport direction by the rotation of the driven roller 170 and the driving roller 180.

The other portion of the ink jet recording apparatus 100 may have the same structure as the known apparatus.

The operation of the ink jet recording apparatus 100, that is, the ink jet recording method, is performed as below. First, the transport unit 160, that is, the transport belt 130 and the transport rollers 140 and 150, is operated to transport the recording medium 101 in the transport direction from the medium feed portion to the platen portion 120. When the recording medium 101 has been transported to the position under the ink jet heads 110A, droplets of the first ink composition are ejected from the ink ejection nozzles 112AE and 112AC of the ink jet heads 110A. The droplets are landed on desired positions on the printing surface (top surface) of the recording medium 101 where images are to be formed. When the recording medium 101 has been transported to the position under the ink jet heads 110B, droplets of the same first ink composition are ejected from the ink ejection nozzles 112BE and 112BC of the ink jet heads 110B. The droplets are landed on desired positions on the printing surface (top surface) of the recording medium 101 where images are to be formed. In this instance, the droplets ejected from the ink ejection nozzles 112BE are deposited on the droplets that have been ejected from the ink ejection nozzles 112AE.

In order to suppress the formation of a striped pattern of nonuniform density, the volume of droplet ejected from each of the ink ejection nozzles 112AC and 112BC is smaller than the volume of droplet ejected from each of the ink ejection nozzles 112AE and nozzle 112BE. Preferably, the volume of droplet ejected from each ink ejection nozzle 112AC is the same as the volume of droplet ejected from each ink ejection nozzle 112BC, and the volume of droplet ejected from each ink ejection nozzle 112AE is the same as the volume of droplet ejected from each ink ejection nozzle 112BE. Preferably, the volume of droplet ejected from the ink ejection nozzle 112AE is half that of droplet ejected from the ink ejection nozzle 112AC, and the volume of droplet ejected from the ink ejection nozzle 112BE is half that of droplet ejected from the ink ejection nozzle 112BC. By thus controlling the ejection volumes as above, striped patterns of nonuniform density can be further prevented in printed images.

The ink ejection nozzles 112AC and 112AE of each ink jet head 110A and the ink ejection nozzles 112BC and 112BE of each ink jet head 110B may eject ink droplets in such a manner that the volume of ink droplets ejected from the nozzles is gradually reduced in the directions from the center of the nozzle alignment to the ends of the alignment in each ink jet head. Alternatively, the volume of ink droplets may be biased around the boundary between the ink ejection nozzles 112AC and the ink ejection nozzles 112AE and the boundary between the ink ejection nozzles 112BC and the ink ejection nozzles 112BE. In these cases as well, striped patterns of nonuniform density in the image can be prevented by controlling the total volume of droplets ejected from the ink ejection nozzles aligned in the transport direction to the same volume as that of droplet ejected from each of the other ink ejection nozzles. In particular, the latter case is effective because it can obscure the changes in volume of droplet at the boundary between the portion in which droplets are deposited one on the other and the portion in which droplets are separately deposited.

Subsequently, when the recording medium 101 has transported to the position under the ink jet heads 110C and 110D, droplets of the different color second ink composition are ejected from the nozzles of the ink jet heads 110C and 110D in the same manner as the droplets from the ink jet heads 110A and 110B. The droplets are landed on desired positions on the printing surface (top surface) of the recording medium 101 where images are to be formed. At this time, part of the ink composition may land directly on the printing surface of the recording medium 101, and at least part of the ink composition lands on the image formed with the first ink composition ejected from the ink jet heads 110A and 110B. Thus an image is formed on the recording medium 101. The recording medium 101 on which the image has been formed (printed) is transported to the medium receiving portion disposed downstream from the ink jet head unit 190.

The technique as described above is hereinafter called "color completion method", in which a color ink composition is deposited on all the portions where images of this color are to be formed, and subsequently another color ink composition is ejected on all the portions where other images of this color is to be formed.

In the ink jet recording method of the present embodiment, an ink composition is ejected as droplets from fine nozzles and deposited on a recording medium. Techniques for this method will now be described in detail.

A first technique is electrostatic suction. In this technique, a strong electric field is applied between a nozzle and an acceleration electrode disposed in front of the nozzle so that ink droplets are continuously ejected from the nozzle. A printing information signal is applied to deflecting electrodes while the droplets fly between deflecting electrodes, and recording is thus performed. The droplets may be deposited according to the printing information signal without being deflected.

A second technique is a method for forcibly ejecting ink droplets by applying a pressure to a liquid ink composition with a small pump and mechanically vibrating the nozzle with a quartz resonator or the like. The ink droplets are charged simultaneously with being ejected, and recording is performed by applying a printing information signal to the deflecting electrodes while the ink droplets fly between the deflecting electrodes.

A third technique uses a piezoelectric element. A pressure and a printing information signal are simultaneously applied to a liquid ink composition by the piezoelectric element. Recording is thus performed by ejecting ink droplets.

In a fourth technique, the volume of the liquid ink composition is rapidly expanded by thermal energy. The ink composition is bubbled by being heated with a small electrode according to a printing information signal, and is thus ejected for recording.

Any of the above techniques can be applied to the ink jet recording method of the present embodiment.

The ink composition used in the ink jet recording method of the present embodiment will now be described in detail.

From the viewpoint of safety and handling, aqueous ink compositions mainly containing water as the main solvent are preferably used in the present embodiment. The water is preferably pure water or ultra pure water, such as ion exchanged water, ultrafiltered water, reverse osmosis water, or distilled water. In particular, the water is preferably sterilized by, for example, UV irradiation or addition of hydrogen peroxide. The use of sterile water can prevent the occurrence of mold or bacteria and thus allows long-term storage. From the viewpoint of ensuring appropriate physical properties (yield value, viscosities, etc.), stability and reliability of the ink composition, it is preferable that the ink composition contain 10% to 60% by mass of water.

By controlling the water content in the ink composition in the above range, the amount of water absorbed to the cellulose of plain paper is reduced. Accordingly, the swelling of the cellulose, which is considered to be a cause of cockling and curling, can be prevented. The properties of preventing cockling and curling are referred to as anti-cockling property and anti-curling property, respectively.

If the water content is less than 10% by mass, the fixability to the recording medium may be reduced. In contrast, if the water content is more than 60% by mass, cockling or curling is liable to occur as in use of known aqueous ink compositions, when printing is performed on a recording medium having an absorption layer on a paper support that cannot absorb ink much.

The viscosity of the ink composition at a temperature in the range of 10 to 40° C. is varied depending on the temperature dependences of the coloring agent, moisturizing agent, solvent and other constituents in the ink composition. Among these constituents, the moisturizing agent has a large effect, and tends to increase the viscosity at 10° C. and to reduce the viscosity at 40° C., depending on the material and the amount added or content. In the description herein, when the difference in viscosity between temperatures of 10° C. and 40° C. is small, it is said that the ink composition has a good viscosity property with temperature.

Preferably, the ink composition used in the present embodiment contains at least one moisturizing agent selected from the group consisting of the following groups (A), (B) and (C), from the viewpoint of maintaining a suitable balance among the anti-cockling property, the anti-curling property, the strike-through property, the anti-clogging property, and the viscosity property with temperature. Moisturizing agent (A) is at least one compound selected from group (A) consisting of glycerin, 1,2,6-hexanetriol, diethylene glycol, triethylene glycol, tetraethylene glycol and dipropylene glycol. Moisturizing agent (B) is at least one compound selected from group (B) consisting of trimethylolpropane and trimethylolethane. Moisturizing agent (C) is at least one compound having a molecular weight in the range of 100 to 200 selected from group (C) consisting of betaines, saccharides and urea compounds.

Moisturizing agent (A) is effective particularly in suppressing clogging, and also in suppressing curling and cockling. This moisturizing agent however can penetrate the recording medium, and is accordingly inferior in strike-through property. From the viewpoint of ensuring the above advantage, glycerin and triethylene glycol are preferred as moisturizing agent (A).

Moisturizing agent (B) is effective in suppressing clogging and is superior in strike-through property because it has the effect of suppressing penetration. From the viewpoint of ensuring these advantages, trimethylolpropane is preferred as moisturizing agent (B).

Moisturizing agents (A) and (B) each have a large difference between the viscosities at temperatures of 10° C. and 40° C. Accordingly the viscosity property with temperature of the ink composition is more significantly affected and, thus, the viscosity of the ink composition has a large difference between temperatures of 10° C. and 40° C., as the content of moisturizing agents (A) and (B) is increased in the ink composition.

Moisturizing agent (C) is superior in anti-curling property and anti-cockling property. This moisturizing agent is superior in viscosity property with temperature. Examples of moisturizing agent (C) include betaines that are N-trialkyl-substituted compounds of amino acids, such as glycine betaine (molecular weight: 117, may be referred to as trimethylglycine), γ-butyrobetaine (molecular weight: 145), homarine (molecular weight: 137), trigonelline (molecular weight: 137), carnitine (molecular weight: 161), homoserine betaine (molecular weight: 161), valine betaine (molecular weight: 159), lysine betaine (molecular weight: 188), ornithine betaine (molecular weight: 176), alanine betaine (molecular weight: 117), stachydrine (molecular weight: 185), and betaine glutamate (molecular weight: 189); saccharides, such as glucose (molecular weight: 180), mannose (molecular weight: 180), fructose (molecular weight: 180), ribose (molecular weight: 150), xylose (molecular weight: 150), arabinose (molecular weight: 150), galactose (molecular weight: 180), and sorbitol (molecular weight: 182); and urea compounds, such as allylurea (molecular weight: 100), N,N-dimethylolurea (molecular weight: 120), malonylurea (molecular weight: 128), carbamylurea (molecular weight: 103), 1,1-diethylurea (molecular weight: 116), n-butylurea (molecular weight: 116), creatinine (molecular weight: 113), and benzylurea (molecular weight: 150). If the molecular weight of moisturizing agent (C) is less than 100, the difference between the viscosities at temperatures of 10° C. and 40° C. tends to be increased. On the other hand, if the molecular weight is 200 or more, the viscosity of the ink composition is likely to increase with respect to the content of moisturizing agent (C) in the ink composition. Accordingly, the molecular weight of moisturizing agent (C) is preferably in the range of 100 to 200. Among the above compounds, glycine betaine is particularly suitable because it is highly effective in suppressing curling, and is commercially available as, for example, AMINOCOAT from Asahi Kasei Chemicals.

The total content of moisturizing agents (A), (B) and (C) in the ink composition is preferably in the range of 10% to 40% by mass, from the viewpoint of the anti-curling property, the anti-cockling property, the strike-through property, and the anti-clogging property.

Preferably, the proportion of moisturizing agents on a mass basis is (A):(B):(C)=(1.0):(0.1 to 1.0):(1.0 to 3.5), from the viewpoint of producing the above-described advantageous effects of the moisturizing agent with a good balance. If the ink composition contains two moisturizing agents selected from groups (A), (B) and (C), the mass ratio of the moisturizing agents is preferably (A):(B)=(1.0):(0.1 to 1.0), (A):(C)=(1.0):(1.0 to 3.5), or (B):(C)=(1.0):(1.0 to 3.5), from the same viewpoint as above. If the mass ratio of moisturizing agent (B) to moisturizing agent (A) is higher than the above ratio, the anti-curling property and anti-cockling property are degraded. If it is lower than the above ratio, the strike-through property is degraded. If the mass ratio of moisturizing agent (C) to moisturizing agent (A) is higher than the above ratio, the anti-clogging property is degraded. If it is lower than the above ratio, it becomes difficult particularly to prevent the nonuniformity in image density, and the anti-curling property and anti-cockling property are degraded. If the mass ratio of moisturizing agent (C) to moisturizing agent (B) is higher than the above ratio, the anti-clogging property is degraded. If it is lower than the above ratio, it becomes difficult to control the nonuniformity in image density, and the anti-curling property and anti-cockling property are degraded.

Preferably, the ink composition used in the present embodiment contains a water-soluble organic solvent in order to prevent clogging in the vicinity of the nozzles of the ink jet head, to control the penetration and bleeding of the ink composition into the recording medium, and to make the ink composition easy to dry. Accordingly, the water-soluble organic solvent preferably contains 1,2-alkanediol and/or glycol ether. Examples of 1,2-alkanediol include 1,2-octanediol, 1,2-hexanediol, 1,2-pentanediol, and 4-methyl-1,2-pentanediol. Examples of glycol ether include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol mono-n-butyl ether (TEGmBE), 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether. In addition, 2-pyrrolidone, N-methyl-2-pyrrolidone and the like can also be used as the water-soluble organic solvent. These water-soluble organic solvents are used singly or in combination, and their total content in the ink composition is preferably 1% to 50% by mass, from the viewpoint of ensuring appropriate physical properties (yield value, viscosities, etc.) of the ink composition, and ensuring high print quality and reliability.

In order to control the wettability of the ink composition to the recording medium so as to ensure the penetration into the recording medium and the printing stability in the ink jet recording method, the ink composition preferably contains a surface tension modifier. Preferred surface tension modifiers include acetylene glycol-based surfactants and polyether-modified siloxanes. Exemplary acetylene glycol-based surfactants include Surfinols 420, 440, 465, 485 and 104 and Surfinol STG (each product name, produced by Air Products), and Olfines PD-001, SPC, E1004 and E1010 (each product name, produced by Nissin Chemical Industry), and Acetylenols E00, E40, E100 and LH (each product name, produced by Kawaken Fine Chemical). Exemplary polyether-modified siloxanes include BYK-346, BYK-347, BYK-348 and BYK-UV 3530 (each produced by BYK). These surface tension modifiers can be used singly or in combination in the ink composition, and are contained in such an amount as can control the surface tension of the ink composition in the range of 20 to 40 mN/m, and preferably contained in an amount of 0.1% to 3.0% by mass in the ink composition.

The ink composition may contain a pH adjuster, a complexing agent, an antifoaming agent, an antioxidant, an ultraviolet light absorbent, a preservative, an antifungal agent and other additives, if necessary. Examples of the pH adjuster include alkali metal hydroxides, such as lithium hydroxide, potassium hydroxide, and sodium hydroxide; and ammonia and alkanolamines, such as triethanolamine, tripropanolamine, diethanolamine, and monoethanolamine. Preferably, the ink composition is adjusted to a pH of 6 to 10 by adding at least one pH adjuster selected from the group consisting of alkali metal hydroxides, ammonia, triethanolamine, and tripropanolamine. If the pH of the ink composition is outside this range, the materials of the ink jet printer are likely to be adversely affected, and the printer becomes difficult to recover from clogging.

The pigment used in the ink composition used in the present embodiment may be a known inorganic or organic pigment. Examples of such a pigment include Pigment Yellows, Pigment Reds, Pigment Violets, Pigment Blues and Pigment Blacks that can be designated by color index numbers, and also include phthalocyanine-based pigments, azo-based pigments, anthraquinone-based pigments, azomethine-based pigments, and pigments having a condensed ring. Other pigments may also be used, including organic pigments, such as Yellow Nos. 4, 5, 205 and 401, Orange Nos. 228 and 405, and Blue Nos. 1 and 404; and inorganic pigments, such as carbon black, titanium oxide, zinc oxide, zirconium oxide, iron oxide, ultramarine blue, iron blue, and chromium oxide. Pigments designated by color indexes include C. I. Pigment Yellows 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180 and 198, C. I. Pigment Reds 1, 3, 5, 8, 9, 16, 17, 19, 22, 38, 57:1, 90, 112, 122, 123, 127, 146, 184 and 202, C. I. Pigment Violets 1, 3, 5:1, 16, 19, 23 and 38, C. I. Pigment Blues 1, 2, 15, 15:1, 15:2, 15:3, 15:4 and 16, and C. I. Pigment Blacks 1 and 7. These pigments may be contained singly or in combination in the ink composition.

The pigment used in the present embodiment is preferably dispersed in resin from the viewpoint of appropriately controlling the yield value and viscosities of the ink composition. Accordingly, the pigment is preferably added to the ink composition as a pigment-dispersed liquid. The pigment-dispersed liquid may be prepared by dispersing a pigment with a dispersant, such as a polymer dispersant or a surfactant, in an aqueous medium using a ball mill, a roll mill, a bead mill, a high-pressure homogenizer, a high-speed agitating disperser or the like. A self-dispersing pigment may be prepared by binding a group that can impart dispersion characteristics (hydrophilic functional group and/or its salt) to the surfaces of the pigment particles directly or with an alkyl, alkyl ether or aryl group or the like therebetween, and this self-dispersing pigment may be dispersed or dissolved in an aqueous medium without using a dispersant. The pigment-dispersed liquid thus prepared is added to the ink composition. Preferably, a pigment-dispersed liquid in which a self-dispersing pigment is dispersed in an aqueous medium is used from the viewpoint of appropriately controlling the yield value and viscosities of the ink composition.

Examples of the polymer dispersant include natural polymer dispersants, such as glue, gelatin and saponin; and synthetic polymer dispersants, such as polyvinyl alcohols, polypyrrolidones, acrylic resins (polyacrylic acid, acrylic acid-acrylonitrile copolymer, vinyl acetate-acrylic acid copolymer, vinyl acetate-acrylic ester copolymer, etc.), styrene-acrylic acid resins (styrene-acrylic acid copolymer, styrene-methacrylic acid copolymer, styrene-methacrylic acid-acrylic acid alkyl ester copolymer, styrene-α-methylstyrene-acrylic acid copolymer, styrene-α-methylstyrene-acrylic acid-acrylic acid alkyl ester copolymer, styrene-vinyl acetate-acrylic acid copolymer, etc.), styrene-maleic acid resins, vinyl acetate-fatty acid vinyl-ethylene copolymers, and salts of these resins. These copolymers may be of random, block or graft type.

Surfactants that can be used as the dispersant include anionic surfactants, such as fatty acid salts, higher alkyl dicarboxylic acid salts, higher alcohol sulfates, and higher alkyl sulfonates; cationic surfactants, such as fatty acid amine salts and fatty acid ammonium salts; and nonionic surfactants, such as polyoxyalkyl ethers, polyoxyalkyl esters, and sorbitan alkyl esters.

Among those dispersants, water-insoluble resins are particularly preferred. Preferably, an exemplary water-insoluble dispersant is a block copolymer of a monomer having a hydrophobic group and a monomer having a hydrophilic group (hydrophilic functional group), including a group capable of forming a salt and having a solubility of less than 1 g in 100 g of water at 25° C. after neutralization. Examples of the monomer having a hydrophobic group include methacrylic acid esters, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyanides, such as acrylonitrile and methacrylonitrile; and aromatic vinyl monomers, such as styrene, α-methylstyrene, vinyltoluene, 4-t-butylstyrene, chlorostyrene, vinyl anisole, and vinylnaphthalene. These monomers may be used singly or in combination. Examples of the monomer having a hydrophilic group include polyethylene glycol monomethacrylate, polypropylene glycol monomethacrylate, and ethylene glycol-propylene glycol monomethacrylate. These monomers may be used singly or in combination. Examples of the monomer having a group capable of forming a salt include acrylic acid, methacrylic acid, styrene-carboxylic acid, and maleic acid. These monomers may be used singly or in combination. In addition, macromonomers, whose one end has a polymerizable functional group, such as styrene-based macromonomers and silicone-based macromonomers, and other monomers may be combined.

The water-insoluble resin is preferably used in form of a salt that has been neutralized with an alkaline neutralizer, such as ethylamine, a tertiary amine such as trimethylamine, lithium hydroxide, sodium hydroxide, potassium hydroxide, or ammonia, and preferably has a weight average molecular weight of about 10,000 to 150,000 from the viewpoint of stably dispersing the pigment.

The self-dispersing pigment, which can be dispersed or dissolved in water without using a dispersant, can be prepared by, for example, being subjected to physical treatment or chemical treatment for binding (grafting) a group capable of imparting dispersion characteristics or an active species having a group capable of imparting dispersion characteristics to the surfaces of the pigment particles. For the physical treatment, vacuum plasma treatment may be performed. The chemical treatment may be performed by, for example, wet oxidation in which the surfaces of the pigment particles are oxidized with an oxidizing agent in water, or a process in which a compound having a phenyl group and at least two hydrophilic groups is bound to the surfaces of the pigment so that the hydrophilic groups are bound to the surfaces of the pigment with the phenyl group therebetween. For example, the compound having a phenyl group and at least two hydrophilic groups may be p-aminobenzoic acid or sulfanilic acid. If p-aminobenzoic acid is used, its carboxyl group is bound to the surfaces of the pigment with the phenyl group therebetween. If sulfanilic acid is used, its sulfoxy group or a salt with its sulfoxyl group (for example, sodium persulfate or a sodium salt derived from sodium persulfate) is bound to the surfaces of the pigment with a phenyl group therebetween. Among these, self-dispersing pigments whose surfaces are bound with a hydrophilic group with a phenyl group therebetween are preferred from the viewpoint of the stability in viscosity with time of the ink composition and the prevention of sedimentation resulting from the aggregation of the pigment.

Since ink compositions containing a self-dispersing pigment do not require a dispersant to disperse the pigment, the defoaming property of the ink composition is not degraded by a dispersant. Accordingly, the ink composition is hardly foamed and is easy to prepare so as to have a high ejection stability. Also, since a significant increase in viscosity caused by a dispersant can be suppressed, the pigment content can be increased to increase the print density, or the handling of the ink composition can be easy. Since self-dispersing pigments have these advantages, they are useful for black ink compositions, which are required to form dense images. The black ink composition used in the present embodiment preferably contains a self-dispersing pigment capable of being dispersed or dissolved in water without using a dispersant.

In the present embodiment, a self-dispersing pigment that can be surface-treated by oxidation with a hypohalous acid and/or hypohalous acid salt, a persulfate, or ozone is preferred from the viewpoint of high color developability. By this surface treatment, a hydrophilic group is introduced to the self-dispersing pigment. Self-dispersing pigments that can be surface-treated by oxidation with a persulfate or ozone, particularly self-dispersing pigments that can be surface-treated by oxidation with ozone, are preferred from the viewpoint of (1) preventing the increase in viscosity of the ink composition when the materials are compounded, (2) preventing sedimentation resulting from the aggregation of the pigment, and (3) maintaining the advantages of (1) and (2) for the long term. Commercially available self-dispersing pigments may be used. Exemplary commercially available self-dispersing pigments include Microjet CW-1 (product name, produced by Orient Chemical Industries), and CAB-O-JET 200 and CAB-O-JET 300 (each product name, produced by Cabot).

Preferably, the pigment in the ink composition has a volume average particle size in the range of 50 to 200 nm from the viewpoint of the storage stability of the ink composition and the prevention of nozzle clogging. The volume average particle size can be measured with Microtrac UPA 150 (manufactured by Microtrac) or a particle size distribution analyzer LPA 3100 (manufactured by Otsuka electronics).

Preferably, the ink composition contains 6% to 25% by mass of pigment. If the pigment content is less than 6% by mass, the print density (color developability) can be insufficient. If the pigment content is more than 25% by mass, problems with reliability may occur, such as nozzle clogging or unstable ejection.

Preferably, the ink composition used in the present embodiment contains a resin emulsion from the viewpoint of ensuring a fixability to recorded matter. The resin emulsion preferably contains resin particles having a minimum film forming temperature of less than 20° C. By using resin particles having a minimum film forming temperature of less than 20° C. as the resin emulsion, the resin particles can be formed into a film at temperatures (typically 20° C. or more) in use, and thus, the fixability of the ink composition to the recording medium and the rub fastness of the composition can be enhanced.

The minimum film forming temperature can be measured as below. First, a resin emulsion is applied at a thickness of 0.3 mm onto a stainless steel plate of a thermal gradient tester. The coated stainless steel plate is immediately placed on a plate in a basket containing silica gel and covered with a transparent plastic cover. After the coating is dried, the temperature at a boundary between the uniform, the continuous portion of the coating and the clouded portion of the coating is measured. The measured temperature is the minimum film forming temperature.

Preferably, the resin emulsion contains particles of at least one resin selected from the group consisting of acrylic resins, methacrylic resins, vinyl acetate resins, vinyl chloride resins, and styrene-acrylic resins. These resins may be homopolymer or copolymer, or have a single-phase structure or a multi-phase (core-shell) structure.

Furthermore, it is preferable that at least any one of the resin emulsions added to the ink composition be an emulsion of resin particles prepared by emulsion polymerization of an unsaturated monomer. If resin particles are added singly to the ink composition, they may not be sufficiently dispersed. It is preferable to add resin particles in form of emulsion from the viewpoint of the manufacture of the ink composition. From the viewpoint of the storage stability of the ink composition, acrylic resin emulsion is preferably used.

Resin emulsion such as acrylic resin emulsion can be prepared by a known emulsion polymerization. For example, an unsaturated monomer, such as unsaturated vinyl monomer, can be subjected to emulsion polymerization in water containing a polymerization initiator and a surfactant.

Unsaturated monomers conventionally used for emulsion polymerization can be used for the emulsion polymerization of the present embodiment, and examples of such an unsaturated monomer include acrylic ester monomers, methacrylic ester monomers, aromatic vinyl monomers, vinyl ester monomers, vinyl cyanide monomers, halogenated monomers, olefin monomers, and diene monomers.

More specifically, exemplary unsaturated monomers include acrylic esters, such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic esters, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyanides, such as acrylonitrile and methacrylonitrile; halogenated monomers, such as vinylidene chloride and vinyl chloride; aromatic vinyl monomers, such as styrene, α-methylstyrene, vinyltoluene, 4-t-butylstyrene, chlorostyrene, vinylanisole, and vinylnaphthalene; olefins, such as ethylene and propylene; dienes, such as butadiene and chloroprene; vinyl monomers, such as vinyl ether, vinyl ketone, and vinyl pyrrolidone; unsaturated carboxylic acids, such as acrylic acid, methacrylic acid, itaconic acid, fumaric acid, and maleic acid; acrylamide compounds, such as acrylamide, methacrylamide, and N,N'-dimethylacrylamide; and hydroxy group-containing monomers, such as 2-hydroxyethyl acrylate, 2-hydroxypropyl acrylate, 2-hydroxyethyl methacrylate, and 2-hydroxypropyl methacrylate. These unsaturated monomers may be used singly or in combination.

In addition, polymerizable crosslinking monomers having at least two double bonds may be used as the unsaturated monomer. Exemplary polymerizable crosslinking monomers having at least two double bonds include diacrylate compounds, such as polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds, such as trimethylolpropane triacrylate, trimethylolethane triacrylate, and tetramethylolmethane triacrylate; tetraacrylate compounds, such as ditrimethylol tetraacrylate, tetramethylolmethane tetraacrylate, and pentaerythritol tetraacrylate; hexaacrylate compounds, such as dipentaerythritol hexaacrylate; dimethacrylate compounds, such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds, such as trimethylolpropane trimethacrylate and trimethylolethane trimethacrylate; methylenebisacrylamide; and divinylbenzene. These compounds may be used singly or in combination.

In addition to the polymerization initiator and surfactant used for the emulsion polymerization, a chain transfer agent, a neutralizer and others may be used according to conventional processes. In particular, preferred neutralizers include ammonia, inorganic alkali metal hydroxides, such as sodium hydroxide and potassium hydroxide.

In the present embodiment, it is preferable that the resin emulsion be added so that the resin particle content in the ink composition is in the range of 1% to 10% by mass, from the viewpoint of ensuring physical properties of the ink composition suitable for the ink jet method, reliability (anti-clogging property and ejection stability) and fixability of the ink composition.

Preferably, the resin emulsion in the ink composition has a volume average particle size of 20 to 200 nm from the viewpoint of the dispersion stability of the resin particles in the ink composition.

In the ink jet recording method of the present embodiment, the ink composition preferably has a yield value of 0.50 to 2.00 mPa, more preferably 0.70 to 2.00 mPa. If the yield value is less than 0.50 mPa, it is difficult to prevent sufficiently a striped pattern of nonuniform density from being formed in the image. In contrast, if the yield value is more than 2.0 mPa, it is difficult to suppress the clogging of ink ejection nozzles. In order to control the yield value of the ink composition in the above range, the pigment content or other solid content may be controlled in the ink composition, the pigment may be appropriately selected, or the ratio of the water content to the water-soluble organic solvent content may be controlled. To control the yield values of the ink composition in the above range, a surfactant, a dispersant or a rheology controlling agent may be added to the ink composition, or the content of these additives may be adjusted. The rheology controlling agent contains inorganic particles exhibiting structural viscosity, such as colloidal silica, or contains a component insoluble or hardly soluble in a solvent such as modified urea and urea-modified urethane. Commercially available rheology controlling agents include, for example, BYK rheology controlling agents, such as BYK-405, BYK-420, BYK-425 and BYK-428 (each product name).

In the ink jet recording method of the present embodiment, the TI of the ink composition is preferably 1.10 to 1.20, more preferably 1.11 to 1.20, from the same viewpoint as in the case of controlling the yield value. The TI of the ink composition can be controlled in the same manner as the yield value.

The ink jet recording method of the present embodiment can prevent the clogging of the ink ejection nozzles and can also sufficiently prevent a striped pattern of nonuniform density in the printed image. Particularly when printing is performed using a black ink composition, the striped pattern of nonuniform density can be prevented effectively and reliably.

In the present embodiment, the first ink composition and the second ink composition are printed by the color completion method. The color completion method is performed in such a manner that the recording medium 101 and the ink jet heads 110A and 110B are relatively moved in a single pass, and the ink composition from the same ink jet head is not repeatedly deposited on the same position. Accordingly, this method has the advantages of: (1) allowing high-speed printing; and (2) allowing ink jet heads and their unit to be reduced in size, weight and cost, because there is no need of ink jet heads or nozzle lines for repeatedly depositing the same ink composition on the same position.

The ink jet recording method of the present embodiment produces a recorded material. Since this recorded material has been produced by the ink jet method of the present embodiment, the printed image of the recorded material hardly exhibits a striped pattern of nonuniform density. The image of the recorded material has few missing dots because it has been formed by depositing ink compositions suppressing the clogging of ink ejection nozzles and having stable fixability on a recording medium, as intended. In the recorded material, the ink is safe and stable, and the quality of the record can be maintained on various types of recording medium independently of temperature in use. If plain paper is used, the recorded material is superior in anti-curling, anti-cockling and strike-through property, and may have images on both sides of the recording material.

Thus, an embodiment of the invention has been described. The invention is not limited to the embodiment disclosed above. Also, various modifications may be made without departing from the scope and spirit of the invention. For example, the above embodiment has disclosed a structure in which the ink ejection nozzles are aligned in two lines in each ink jet head. However, the number of lines may be one, or three or more. The ink ejection nozzles in the transport direction are also aligned, but may be staggered.

Although the above embodiment has disclosed an ink jet recording method using two color ink compositions, the method of another embodiment may use only a single color ink composition, or three or more color ink compositions such as three, four, five or six color ink compositions. When only a single color ink composition is used, the ink jet heads 110A and 110B are provided, but the ink jet heads 110C and 110D may not be provided. When three color ink compositions are used, it is preferable that a plurality of ink jet heads for other colors are disposed downstream from the ink jet heads 110D in the same manner as the ink jet heads 110A and 110B.

EXAMPLES

The invention will be further described in detail with reference to Examples. The invention is however not limited to the examples.

Preparation of Coloring Agent

Self-Dispersing Pigment Bound with Hydrophilic Group by Oxidation with Persulfate Pigment-Dispersed Liquid K1

To 3 L of 2 N sodium persulfate solution was added 150 g of a carbon black, Color Black S170 (product name, produced by Degussa), and the carbon black was oxidized by stirring the mixture at an agitation speed of 1 $s^{-1}$ at 60° C. for 10 hours. The oxidized carbon black was filtered through an ultrafiltration membrane AHP-1010 (manufactured by Asahi Kasei) to remove residual salts. Then, an aqueous solution of sodium hydroxide was added to adjust the pH to 8. Subsequently, ultrafiltration was performed again for purification by removing excess salts and for concentration by removing water. In this operation, the carbon black content was adjusted so that the solution after treatment would contain 20% by mass of carbon black. Thus black pigment-dispersed liquid KA was prepared.

Preparation of Ink Composition

Constituents of each ink composition were mixed in a proportion shown in Table 1, and the mixture was filtered through a membrane filter of 10 μm in pore size to yield an ink composition. Each content shown in Table 1 is on the percent by mass basis, and "balance" in the row of ion exchanged water means that ion exchanged water was added to a total of 100% by mass.

TABLE 1

| | Black ink composition | | | | | |
|---|---|---|---|---|---|---|
| | K1 | K2 | K3 | K4 | K5 | K6 |
| Black pigment-dispersed liquid KA | 50 | 45 | 35 | 35 | 55 | 25 |
| Glycerin | 8 | 8 | 8 | 8 | 8 | 8 |
| Triethylene glycol | 5 | 5 | 5 | 5 | 5 | 5 |
| 1,2-Hexanediol | 5 | 5 | 5 | 5 | 5 | 5 |
| Trimethylolpropane | 3 | 3 | 3 | 3 | 3 | 3 |
| TEGmBE | 20 | 20 | 20 | 13 | 20 | 20 |
| Olfine E1010 | 0.5 | 0.5 | 0.5 | 0.5 | 0.5 | 0.5 |
| Surfinol 104 | 0.5 | 0.5 | 0.5 | 0.5 | 0.5 | 0.5 |
| Triethanolamine | 1 | 1 | 1 | 1 | 1 | 1 |
| Water | Balance | Balance | Balance | Balance | Balance | Balance |
| Pigment content in ink composition | 10 | 9 | 7 | 7 | 11 | 5 |
| Water content in ink composition | 47 | 48 | 50 | 57 | 46 | 52 |

Evaluation of Ink Compositions

Test 1: Shear Viscosity, TI, Yield Value, and Residual Viscosity

Each ink composition was placed in a cone/plate (diameter: 75 mm, angle: 1°) attached to a viscoelasticity analyzer Physica MCR301 (product name) manufactured by Anton Paar, and the shear viscosity of the ink composition was measured at 20° C. at shear rates of 10 to 1000 $s^{-1}$. The shear viscosity at a shear rate of 200 $s^{-1}$ was recorded as the shear viscosity in each Example. The TI was calculated from the changes in shear viscosity between different shear rates, and the values obtained in the above measurement were applied to Casson equation to calculate the yield value and the residual viscosity.

The results are shown in Table 2.

Test 2: Striped Pattern of Nonuniform Density

Using an ink jet printer as shown in FIGS. 1 to 4 in which only the ink jet heads 110A and 110B were charged with an ink composition, a dot screen was printed on the following two types of plain paper at a duty of 25%. Plain paper Xerox P (manufactured by Fuji Xerox) and Xerox 4200 (manufactured by Xerox) were used as recording media. The printed materials were allowed to stand under normal conditions for an hour, and the state of the images formed at the positions at which the ink ejection nozzles were aligned in the transport direction was visually observed. The evaluation criteria were as follows:

A: No striped pattern was observed in the images.

B: A striped pattern was slightly observed in the images, but within an acceptable range.

C: A striped pattern outside an acceptable range was observed in the images.

The results are shown in Table 2.

Test 3: Clogging (Ejection Stability)

Using an ink jet printer as used in Test 2, a pattern including a solid image and a ruled line was continuously printed at 40° C. Every time when the printed image was disordered by dot missing during printing, an operation for recovery (nozzle cleaning) was performed. While 100 pages were continuously printed, the number of nozzle cleaning operations was counted. The evaluation criteria were as follows:

A: Nozzle cleaning was not performed once.

B: Nozzle cleaning was performed once or twice.

C: Nozzle cleaning was performed at least three times.

The results are shown in Table 2.

Test 4: Color Developability (Optical Density (OD Value))

Using an ink jet printer as used in Test 2, a patch pattern (solid image) was printed at a duty of 100%. Plain paper Xerox P (manufactured by Fuji Xerox) and Xerox 4200 (manufactured by Xerox) were used as recording media. The OD value of the printed image was measured five times (five points) with Gretag densitometer (manufactured by Gretag-Macbeth). The arithmetic mean of the OD value was calculated for each ink composition. The optical density was evaluated from the obtained average OD value according to the following criteria:

A: $1.2 \leq OD$

B: $1.1 \leq OD < 1.2$

C: $OD < 1.1$

The results are shown in Table 2.

TABLE 2

| | Example 1 | Example 2 | Example 3 | Example 4 | Comparative Example 1 | Comparative Example 2 |
|---|---|---|---|---|---|---|
| Ink composition | K1 | K2 | K3 | K4 | K5 | K6 |
| Pigment (mass %) | 10 | 9 | 7 | 7 | 11 | 5 |
| Yield value (mPa) | 1.88 | 1.49 | 0.78 | 0.55 | 2.43 | 0.39 |
| Shear viscosity (mPa · s) | 8.22 | 8.27 | 8.27 | 7.41 | 8.76 | 8.18 |
| Residual viscosity (mPa · s) | 7.52 | 7.65 | 7.82 | 7.05 | 7.93 | 7.87 |
| TI | 1.19 | 1.16 | 1.12 | 1.10 | 1.20 | 1.08 |
| Striped pattern of non-uniform density | A | A | A | B | A | C |

TABLE 2-continued

| | Example 1 | Example 2 | Example 3 | Example 4 | Comparative Example 1 | Comparative Example 2 |
|---|---|---|---|---|---|---|
| Clogging | A | A | A | A | C | A |
| OD value | A | A | A | A | A | B |

What is claimed is:

1. An ink jet recording method using a recording apparatus including a plurality of ink jet heads, the ink jet recording method comprising:

performing printing by depositing droplets of an ink composition ejected from the ink jet heads on a recording medium, wherein the ink jet heads are aligned in a direction cross to a transporting direction of the recording medium and the ink composition has a yield value of 0.50 to 2.00 mPa and contains a pigment, a water-soluble organic solvent, a surface tension modifier, 10% to 60% by mass of water, and a humectant, the humectant being a mixture of the following compounds (A), (B) and (C):

(A) at least one compound selected from glycerin, 1,2,6-hexanetriol, diethylene glycol, triethylene glycol, tetraethylene glycol, and dipropylene glycol, (B) either trimethylol propane or trimethylol ethane, or a mixture thereof, and (C) at least one compound selected from betaines, saccharides, and ureas and having a molecular weight in the range of from 100 to 200, at a content mass ratio of (A):(B):(C) of 1.0:0.1 to 1.0:1.0 to 3.5.

2. The ink jet recording method according to claim 1, wherein the ink composition has a shear viscosity at a shear rate, and the ratio of the shear viscosities at shear rates of 10 and 1000 s-1 is 1.10 to 1.20.

3. The ink jet recording method according to claim 1, wherein the pigment is a self-dispersing carbon black.

* * * * *